United States Patent [19]
Karabedian et al.

[11] Patent Number: 5,443,769
[45] Date of Patent: * Aug. 22, 1995

[54] POLYSTYRENE FOAM SHEET MANUFACTURE

[75] Inventors: James A. Karabedian, Toledo, Ohio; Maurice W. Blackwelder, Bardstown, Ky.

[73] Assignee: Owens-Illinois Plastic Products Inc., Toledo, Ohio

[ * ] Notice: The portion of the term of this patent subsequent to Feb. 21, 2009 has been disclaimed.

[21] Appl. No.: 118,081

[22] Filed: Nov. 24, 1993

Related U.S. Application Data

[60] Division of Ser. No. 752,430, Aug. 30, 1991, abandoned, which is a continuation of Ser. No. 538,291, Jun. 14, 1990, Pat. No. 5,082,608.

[51] Int. Cl.⁶ .................... B29C 47/06; B29C 47/90
[52] U.S. Cl. .................... 264/46.1; 264/46.3; 264/50; 264/565; 264/569; 264/173; 264/209.3; 425/4 C; 425/133.1; 425/387.1; 425/388
[58] Field of Search ............ 264/46.1, 50, 565, 566, 264/568, 569, 46.3, 173, 209.3, 209.4, 209.5, 211; 425/4 C, 377, 378.1, 384, 387.1, 131.1, 133.5, 133.1, 388

[56] References Cited

U.S. PATENT DOCUMENTS

| | | | |
|---|---|---|---|
| 3,619,445 | 11/1971 | Carlson, Jr. | 264/565 |
| 3,835,209 | 9/1974 | Karabedian | 425/384 |
| 3,887,673 | 6/1975 | Sato et al. | 264/568 |
| 3,957,566 | 5/1976 | Rahlfs | 264/569 |
| 4,123,487 | 10/1978 | Saito | 264/565 |
| 4,203,942 | 5/1980 | Sims, Jr. et al. | 264/565 |
| 4,463,861 | 8/1984 | Tsubone et al. | 264/46.1 |
| 4,486,366 | 12/1984 | Reddy | 264/46.1 |
| 5,082,608 | 1/1992 | Karabedian et al. | 264/46.1 |

*Primary Examiner*—Mathieu D. Vargot

[57] ABSTRACT

The method of making polystyrene foam for foam products which includes utilizing atmospheric gases as the blowing agents or preferably mixing one or more of these gases and a blending agent which is non-volatile at the extrusion temperatures, introducing the mixture to a molten thermoplastic polystyrene resin containing nucleating agents such as sodium bicarbonate and citric acid and extruding the thermoplastic in the form of a foam. The resultant foam has substantially no residual blowing agent, is dimensionally stable at ambient temperatures and when used with a non-volatile blending agent can be made with small amounts of blowing agent permitting cooling of the melt without high loading on the extruder. The foam may be coextruded with one or more layers of thermoplastic film so that the resultant product is adapted for use for plates, cups, food containers or packaging and for labels for containers such as glass and plastic containers and for labels that are shrunk in place on a container.

15 Claims, 3 Drawing Sheets

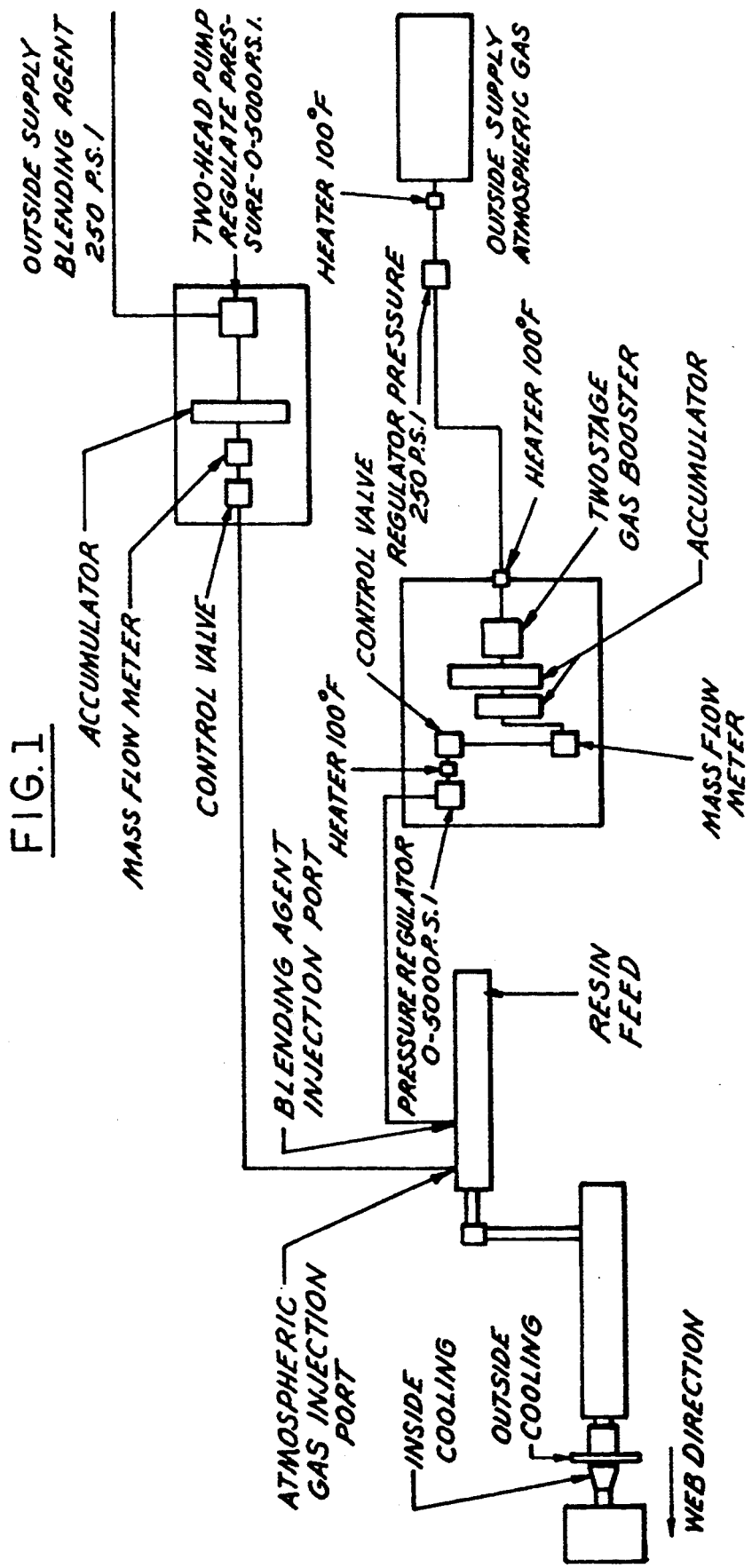

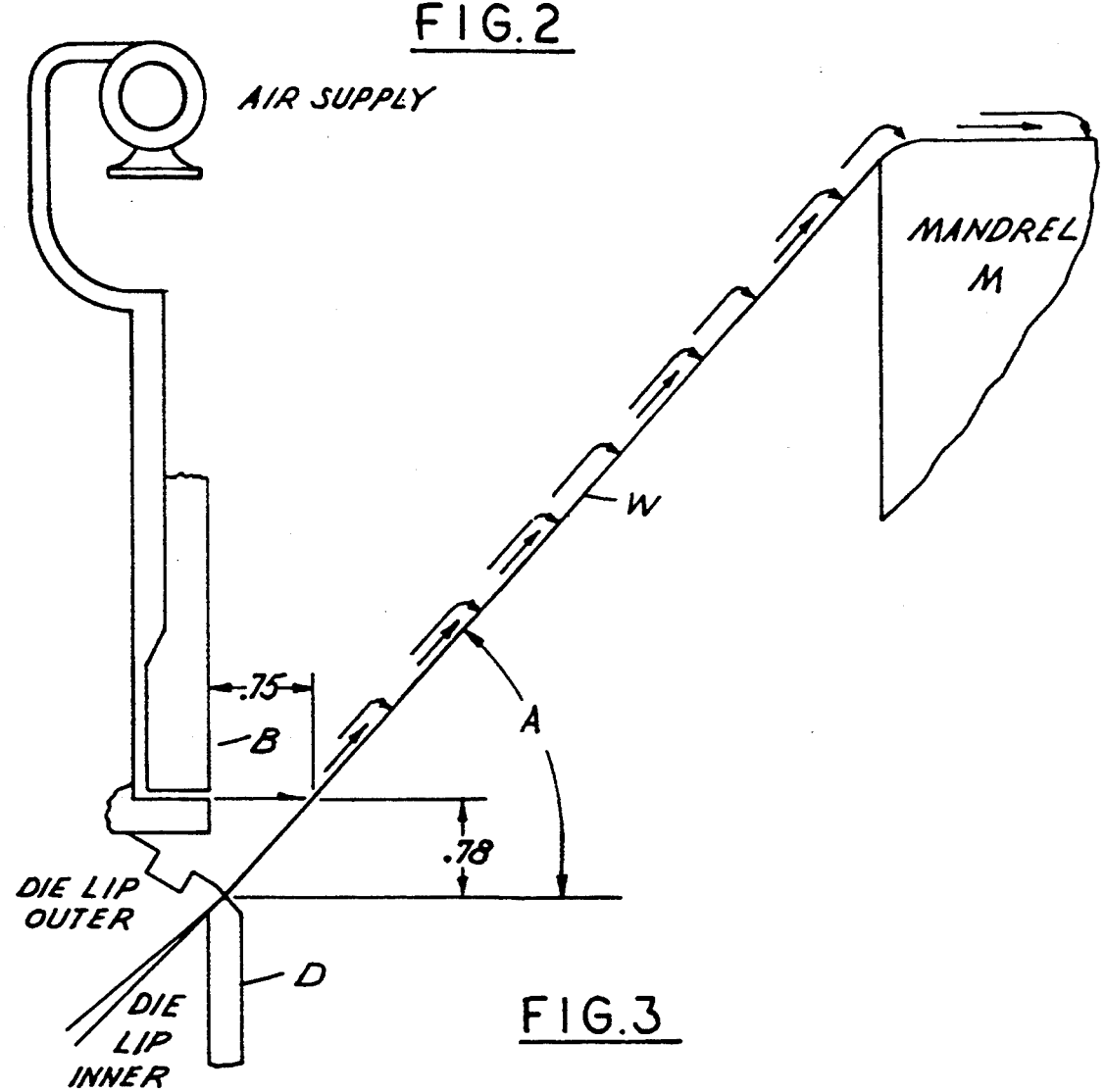
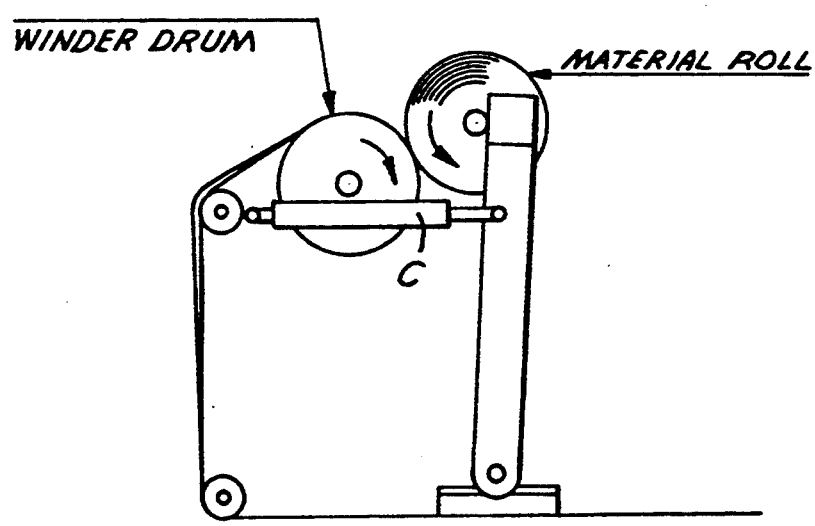

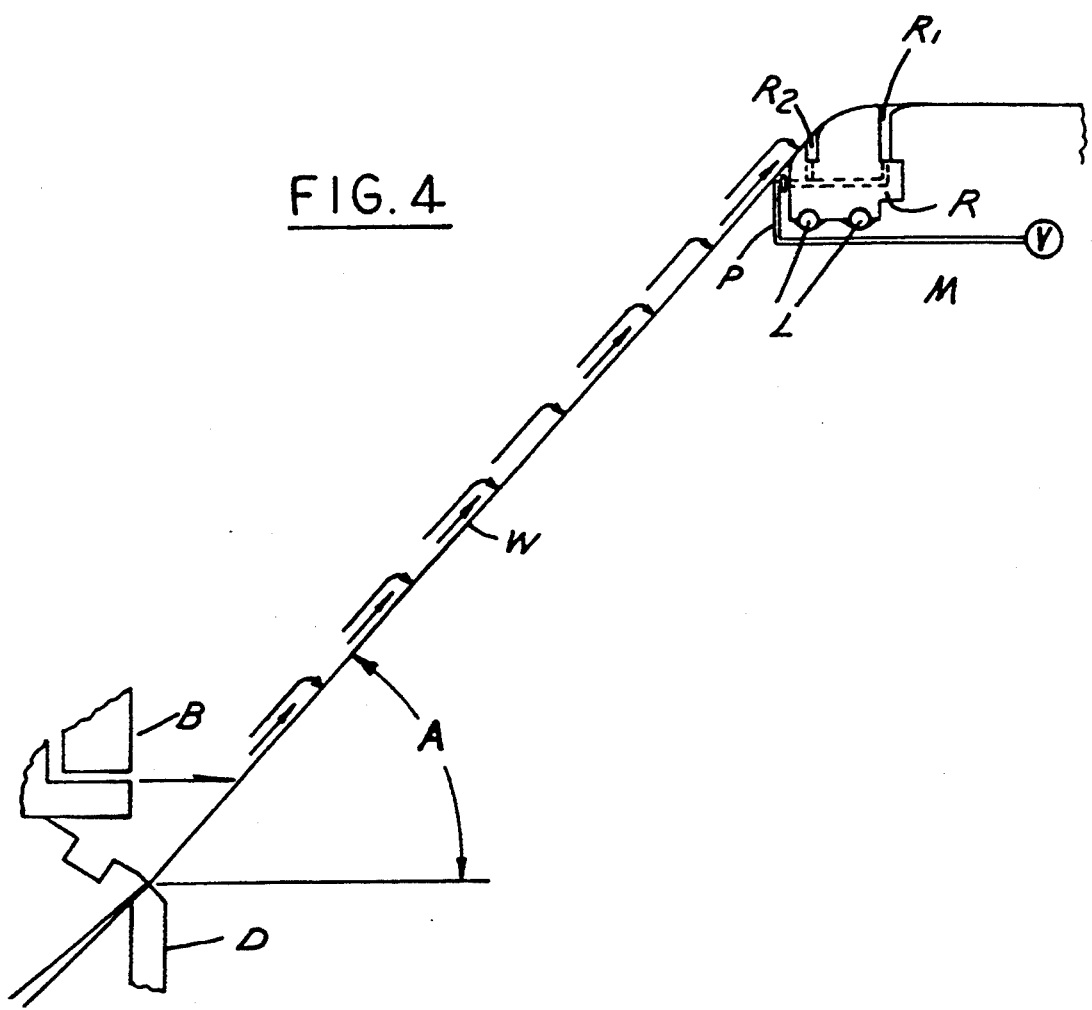

POLYSTYRENE FOAM SHEET MANUFACTURE

This is a divisional of application Ser. No. 07/752,430 filed on Aug. 30, 1991, now abandoned, which is a continuation of application Ser. No. 07/538,291 filed Jun. 14, 1990, now U.S. Pat. No. 5,082,608.

This invention relates to manufacture of foam and particularly the manufacture of polystyrene foam.

BACKGROUND AND SUMMARY OF THE INVENTION

In the manufacture of polystyrene foam, it has been common to utilize blowing agents such as chlorofluorocarbons solely or together with alkanes, usually pentane or isopentane. Such a foam is usually made by extrusion. Due to the solubility of chlorofluorocarbons and certain alkanes in polystyrene, the extrusion melt viscosity is reduced and this permits sufficient cooling of the melt so that high load, indicated by amperage, will not be applied to the extruder drive motor.

Pentane and chlorofluorocarbons such as Freon 11 and 12, for example, are partially soluble in polystyrene and reduce the melt viscosity enabling the extruder adequately to cool and extrude the molten plastic material at lower loads and temperatures in order to generate a good smooth foam surface and appearance, small cell size control for opacity and other foam physical properties such as orientation, shrinkage characteristics and stiffness. Loss of residual blowing agent over a period of time, however, creates a shrinkage in the sheet material, an increase in thickness and an increase in softening point temperature as the residual blowing agent is reduced.

Where the foam is intended for use as a label on glass or plastic containers wherein the label is shrunk in place, the foam material is extruded and stretched in one direction more than the other. Preferably, the label material is coextruded with a plastic film. The gradual loss of residual blowing agent causes the label material to vary in shrinkage characteristics.

U.S. Pat. No. 4,424,287 is directed to a polymer foam process for making thermoformed articles wherein the blowing agent comprises at least an atmospheric gas and at least one volatile plasticizing blowing agent. As stated in this patent, early attempts to mix normally liquid hydrocarbons and normally gaseous blowing agents have not been successful and it is necessary that great care be exercised in production of a polymer foam with highly-volatile blowing agents such as carbon dioxide even in such a mixture. Accordingly, as set forth in this patent, it was thought necessary to utilize both the inert gas such as carbon dioxide and a volatile plasticizing organic blowing agent such as pentane and to thermoform the articles immediately after extrusion.

U.S. Pat. No. 4,436,679 discloses a method of making foam wherein water and natural gas are introduced into a melt.

U.S. Pat. No. 4,470,938 discloses a method of utilizing atmospheric gases for forming thermoformed articles wherein the process includes introducing, to a molten resin charge under pressure, a gas blowing agent from a supply gas source of comparatively higher pressure, said introducing being by means of discrete uniform volumetric charges of gas into said resin, wherein said discrete volumetric charges are introduced by means of a free piston-cylinder combination given motive power by said supply gas source. Although this patent mentions the use of a number of atmospheric gases, no claim was made as to any beneficial results as to the product and no commercial use has been made of such a process.

Among the objectives of the present invention are to provide a method of making polystyrene foam wherein the method utilizes atmospheric gases as blowing agents which are inherent in the atmosphere; wherein the blowing agent is substantially entirely released when the polystyrene foam is extruded; wherein the melt can be cooled to normal process levels and not create high loading on the extruder or shear heat from high polymer viscosity; wherein the amount of shrinkage can be controlled as may be required for the ultimate use of the foam; wherein the density and cell size can be controlled; and which utilizes conventional extrusion apparatus.

In accordance with the invention, the method of making polystyrene foam comprises mixing an atmospheric gas such as carbon dioxide, nitrogen or air and preferably a non-volatile blending agent, introducing the gas or the mixture to a molten thermoplastic polystyrene resin containing nucleating agents such as sodium bicarbonate and citric acid and extruding the thermoplastic in the form of a foam. The resultant foam has substantially no residual blowing agent, is dimensionally stable at ambient temperatures and when used with a non-volatile blending agent can be made with small amounts of blowing agent permitting melt cooling without high loading on the extruder. The foam may be coextruded with one or more layers of a thermoplastic film so that the resultant product is adapted for use for plates, cups, food containers or packaging and for labels for containers such as glass and plastic containers and for labels that are shrunk in place on the container.

DESCRIPTION OF THE DRAWINGS

FIG. 2 is a partly schematic diagram of a portion of the extrusion apparatus.

FIG. 3 is a schematic drawing of an apparatus utilized in the process downstream of the extruder.

FIG. 4 is a partly schematic diagram of a modified form of extrusion apparatus.

DESCRIPTION

Figure 1:
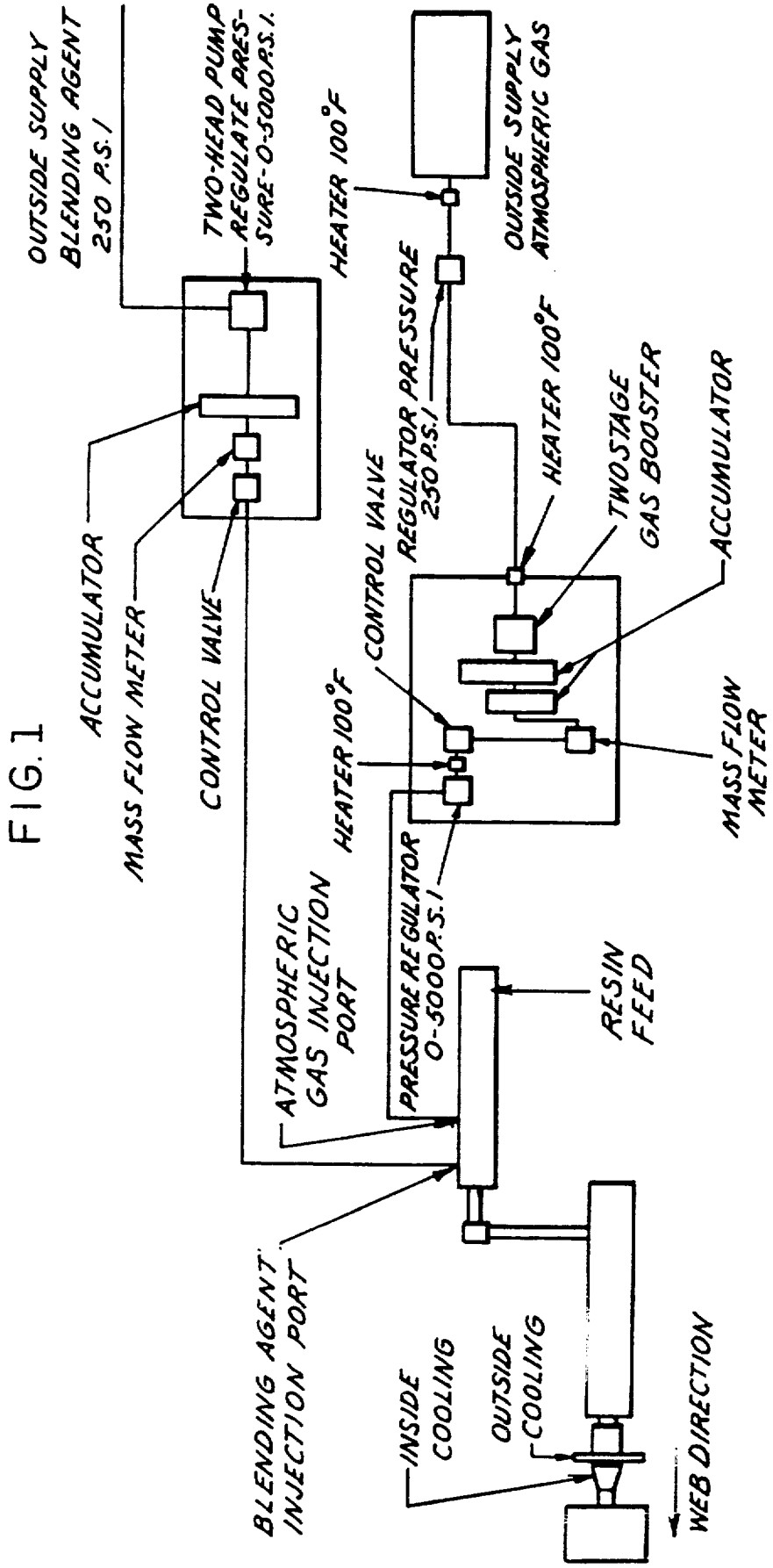
FIG. 1 is a schematic drawing of an extrusion apparatus utilized in the method.

In accordance with the invention, an atmospheric gas such as carbon dioxide, nitrogen or air alone or preferably combined with a blending agent which is non-volatile at the extrusion temperatures such as a high molecular weight ester having low volatility at high temperatures is introduced into the thermoplastic molten polystyrene melt, and the mixture is extruded.

Where a mixture of atmospheric gas and a blending agent which is non-volatile at the extrusion temperatures is used, the atmospheric gas and the non-volatile blending agent may be mixed prior to introduction or separately.

Referring to FIG. 1, the atmospheric gas is supplied to the first stage of a tandem extruder system through a pressure regulator, heater, two stage gas booster and accumulator, mass flow meter control valve, second heater and pressure regulator to the molten massive plastic material in the first or primary extruder section. Where the liquid non-volatile blending agent such as the non-volatile ester is used, it is pumped to an accumulator and thereafter to a mass flow meter and control valve for injection into the plastic material downstream of the point of injection of the atmospheric gas. Alternatively, the blending agent can be mixed with the atmospheric gas in a static mixer and injected at a single point of injection. The blended material then passes to the secondary conditioning or cooling extruder and is extruded in the form of a tubular web that is preferably cooled from the inside and outside.

Referring to FIG. 2, in a preferred form of the invention, the internal cooling mandrel M onto which the tubular material is passed is located relative to the extruder die D such that the frustoconical web W forms an angle A with the axis of the extruder that is preferably greater than 45° and ranges between 45° and 90°. In addition, the cooling air is supplied to the exterior of the tubular web closely adjacent the extruder die lip and is caused to flow parallel to the web W. Specifically, the air is supplied at an acute angle B tangentially of the web W as it is expanded outwardly to cool the external surface of the web W. This flow of air causes additional ambient air to be drawn to supplement the air being supplied for maximum cooling by turbulent flow. Cooling of the web and moving the web at an angle greater than 45° minimize and substantially eliminate axially extending corrugations which occur in making foam materials with atmospheric gases.

In the form of the invention shown in FIG. 4, in addition to the arrangement in FIG. 2, there is provided a tapered cooling ring R adjacent the front of the cooling mandrel. The ring R is cooled by lines L and includes annular recesses $R_1$ and $R_2$ that are connected by a line P to a vent valve V to the atmosphere. As the web W contacts and passes over the tapered cooling ring R, which is maintained at a temperature independent of that of the mandrel M, further cooling of the web occurs at a smaller diameter than that of the mandrel. As the web cools, a force is required to pull and stretch the web over the tapered cooling ring creating a tension between the mandrel M and the conventionally used pull rollers. The provision of the annular recesses $R_1$, $R_2$ being vented through a vent port produces a partial vacuum as the web moves across in contact with the cooling ring R maintaining the web in good contact with the cooling ring R. By use of the valve, the degree of venting can be increased or decreased such that the degree of vacuum can be increased or decreased.

It has been found that utilizing a percentage of atmospheric gas by weight of less than 3% by weight produces satisfactory results.

It has been found that when a non-volatile blending agent such as an ester is also used, the method permits the ready processing of the polystyrene melt by cooling without high loading on the extruder and so that the blowing agent is substantially entirely released upon extrusion of the foam. The resultant product has controlled rate of shrinkage without change in aging, cell size, opacity, stiffness, smoothness, caliper, density, low cost, but most important environmentally acceptable.

As used herein, the non-volatile blending agent comprises a high molecular weight agent which is non-volatile at the extrusion temperatures such as 300°–325° F. The molecular weight of the non-volatile blending agent preferably ranges between 350 and 450. Non-volatile blending agents which have produced satisfactory results comprise diisodecyl adipate, ditridecyl adipate and trioctyl trimellitate.

The aforementioned non-volatile blending agents can be used alone or in blends or mixtures for control and adjustment of viscosity.

The thermoplastic material must include a nucleating agent such as sodium bicarbonate and citric acid, as is well known in the art.

For use in extruding a polystyrene foam sheet which has functional properties suitable for use in application by shrinkage from a formed sleeve to conform to the contour shape of a container to perform as a label, the method comprises utilizing other atmospheric gases such as carbon dioxide, nitrogen or air as the sole and exclusive blowing agent for producing said foam sheet. The method preferably incorporates the injection of the high molecular weight non-volatile blending agent having very low volatility at extrudate temperatures (e.g., 300°–325° F.) into the polymer melt. Such material provides a solvating action weakening intermolecular bonding of the polymer and reducing melt viscosity. Preferably, directly downstream following the injection of the organic fluid, air (carbon dioxide, nitrogen or air, or blends thereof) after having been compressed in excess of extruder injection point pressure (typically, in excess of 3000PSI), is injected through a second injection port into the polymer.

As indicated in FIG. 1, the extrusion equipment used may be a conventional tandem system employing two extruders working in conjunction with each other whereby the first extruder melts the polymer mixed with nucleating agent, which accepts by injection and mixes in a blowing agent and transfers said mix to a second extruder which cools the melt and conveys it into an annular die which transforms the melted mass into a continuous sheet foam.

No extrusion equipment modifications such as screw designs, die designs, or special mixing devices are necessary. Standard type pumps as suitable for organic fluids and as suitable for boostering industrial type gas pressure with appropriate metering devices which are known to those skilled in the art are the only equipment changes by addition or modification.

In the past, CFCs (chlorofluorocarbons) or HCFCs (hydrochlorofluorocarbons) and alkanes (usually pentane or isopentane) were commonly used as blowing agents in the industry to produce polystyrene foam sheet which is converted into a variety of products such as disposable cups, meat trays, egg cartons, etc. Such fluorocarbons and alkanes are partially soluble in polystyrene hence reducing the melt viscosity and permitting process cooling of the extruder melt without creation of high load or power demand on the extruder drive motor.

The use of blowing agents such as atmospheric type inert gases (carbon dioxide, nitrogen, air) create two significant differences compared to CFCs, HFCs or alkanes:

(1) The amount (usage) of blowing agent is greatly reduced. For example, the following table illustrates approximate comparative amounts of blowing agent needed to produce a label type foam in the caliper range of 5–12 mils having a density area around 12–20 PCF:

TABLE 1

| Blowing Agent | Usage % |
| --- | --- |
| Freon 11 | 5–7 |
| Freon 12 | 3–5 |
| Pentane/Isopentane | 3–5 |
| Freon 22 | 1–3 |
| Carbon dioxide | 1–2 |
| Air | .5–1 |
| Nitrogen | .5–1 |

It can be seen that carbon dioxide is effective in a much lower amount than prior blowing agents for comparable densities. With nitrogen and air, even lesser amounts are needed.

(2) Inasmuch as the atmospheric gases are relatively insoluble in the polystyrene, the resultant foam material can be stored and used at various times without any substantial change in the properties thereof including the shrinkage properties.

This may be contrasted to fluorocarbons and alkanes which are soluble in polystyrene and reduce the melt viscosity enabling the extruder to convey or advance the material at lower power loads with considerable latitude to cool the melt to around 300° F. before exiting from the die as necessary to generate good smooth foam without ruptured cells and obtain other foam sheet physical properties such shrinkage characteristics and stiffness. Due to the solubility of the CFCs and alkanes approximately half or greater of the amount of these type materials injected remains dissolved in the polystyrene after emerging from the die. These materials are volatile and will gradually evaporate from the sheet with age over a period of months. Label stock intended for application onto a container or bottle by use of shrinkage obviously requires that shrinkage properties be a part of the sheet characteristics. The CFCs and alkanes act as plasticizers in polystyrene lowering the Tg of the polymer and enhancing shrinkage upon application of sufficient heat. The amount of shrinkage and the temperature at which shrinkage will start is dependent upon how much residual CFC or alkane is present in the sheet.

The following data illustrates the effect of temperature on shrinkage of a sheet containing 2% residual fluorocarbon. Sample used was 7 mil caliper with 20 PCF density:

TABLE 2

| Temperature | % Machine Direction Shrinkage |
|---|---|
| 200° F. | 6.0 |
| 210° F. | 14.0 |
| 220° F. | 45.0 |
| 230° F. | 55.0 |
| 240° F. | 60.0 |
| 250° F. | 62.0 |

However, as stated fluorocarbon are volatile at room temperature and the amount of fluorocarbon will gradually decrease with age. Rate of loss is obviously dependent upon storage conditions, whether in roll form, width of web, etc. In an accelerated lab test with a sample sheet, exposed for test purposes the shrinkage rate of loss is illustrated as follows using 210° F. to simplify data:

TABLE 3

| Aging Period (weeks) | % Machine Direction Shrinkage @ 210° F. |
|---|---|
| 0 | 14.0 |
| 1 | 10.0 |
| 2 | 9.0 |
| 3 | 8.0 |
| 4 | 7.0 |
| 5 | 6.0 |

In a process where foam labels are applied by shrinkage onto a container or bottle, high applicating speeds such as 500–1000 units/minute are used. This places significant importance on the shrinkage rate and on-set of shrinkage temperature in order to obtain a smooth conformance of the foam to the contour of the container shape without wrinkling. Use of a volatile blowing agent presents a variable in shrinkage properties so that consistent label application may not be achieved in order to obtain a smooth conformance with the container. Also, in some cases the increased need for heat to shrink leads to a blistering effect on the printed label surface diminishing the aesthetic appearance of the label.

The present method utilizes atmospheric gases (including air, nitrogen, carbon dioxide or mixtures thereof) and preferably contemplates injecting into the melt a non-volatile blending agent such as a high molecular weight ester having excellent stability to heat whereby it is resistant to decomposition with heat and within practical purposes can be considered as non-volatile in the application process of polystyrene foam extrusion. While the number of non-volatile blending agents meeting such criteria is limited, ditridecyl adipate and trioctyl trimellitate or blends thereof for viscosity adjustment have successfully been utilized, diisodecyl adipate being considered marginally acceptable for inclusion to the list due to a slightly higher tendency to volatilize with heat exposure.

Organic materials were evaluated in the laboratory by exposing them to conditions more extreme than encountered in extrusion. Each material was placed in a wide mouth open cup and held at a temperature of 155° C. with measurement of volatile loss at different time intervals. Data on the three liquid blending agents above were as follows:

TABLE 4

| Name | Molecular Weight | % Volatility @ 155° C. After 2 hours | 24 hours |
|---|---|---|---|
| Diisodecyl Adipate | 427 | 0.3 | 6.0 |
| Ditridecyl Adipate | 510 | 0.2 | 2.8 |
| Trioctyl Trimellitate | 550 | 0.6 | 1.5 |

Examples of materials which did not meet the acceptable criteria for use are illustrated as follows:

TABLE 5

| Name | Molecular Weight | % Volatility @ 155° C. After 2 hours | 24 hours |
|---|---|---|---|
| Diisooctyl Adipate | 373 | 1.7 | 24.1 |
| Dibutyl Sebacate | 316 | 4.3 | 60.4 |
| Diisobutyl Azelate | 303 | 14.0 | 97.0 |
| Triethylene Glycolcaprate-caprylate | 430 | 2.1 | 27.5 |

The embodiment of the invention wherein the method includes injecting a non-volatile blending agent having highly selective heat resistance to decomposition and volatility while using an atmospheric type gas for the blowing agent can include a valving arrangement whereby the two materials are premixed and injected in the same port or the materials are injected into separate ports if the extruder is so equipped with two individual ports. No special mixing devices are necessary and no extruder screw modifications are needed. As known by those familiar with the art, a pump adequate for handling the liquid non-volatile blending agent and a pump for pumping atmospheric gas capable of building the pressure to the area of 3000–4000 PSI to permit injection into the extruder is necessary. Accordingly, a metering system appropriate for use with each material is required to control the usage rate.

The method of the present invention is especially advantageous for making foam material to be used in fabricating structures where a foam sheet must be shrunk. Labels as well as disposable cups are well known examples of such applications. Sheet material for both of these type applications have been produced within the embodiment of this invention with corresponding conversion to end use products. In label stock with a caliper use range of 5–12 mils and density area of 18–22 PCF, a usage rate of non-volatile blending agent of approximatley 1.0% of the foam weight has been preferred. For cup stock in the caliper range of 16–22 mils and density area of 12–14 PCF, a usage rate of 2.0% of the foam weight has been successful.

To evaluate the benefit of the non-volatile blending agent, the following data was determined from tests on motor load measured by amperage and melt temperature at entry into the die. Ditridecyl adipate was used as the non-volatile blending agent:

TABLE 6

| Blowing Agent | Amount Blending Agent | Cooling Amperage | Melt Temp. of |
|---|---|---|---|
| Nitrogen | 0 | 119 | 318 |
| Nitrogen | 1.5 | 93 | 318 |
| Carbon dioxide | 0 | 105 | 329 |
| Carbon dioxide | 1.5 | 95 | 322 |

As can be seen, the addition of the blending agent functions to reduce the amperage required to maintain the same or lower melt temperature.

Another advantage of use of the non-volatile blending agent is that it will lower the Tg of the polymer and hence enhance onset of shrinkage at lower temperatures of the foam upon application of heat as previously indicated as needed in certain industrial applications. The relative effect of the concentration of the use of blending agent is indicated by the following data:

TABLE 7

| Machine direction percent shrinkage * where the organic fluid is diisodecyl adipate. | | | |
|---|---|---|---|
| % Blending Agent | @ 200° F. | @ 210° F. | @ 220° F. |
| 0 | 3.4 | 5.0 | 23.0 |
| 0.5 | 3.9 | 7.8 | 32.0 |
| 1.0 | 4.9 | 15.0 | 41.0 |
| 1.5 | 6.6 | 16.5 | 48.5 |
| 2.0 | 11.5 | 18.1 | 53.0 |

*Melt temperature, web cooling conditions, molecular weight of the polystyrene and output as examples can influence shrinkage and level of shrinkage as such must be in concert with other properties required.

Another advantage of the non-volatile blending agent is that shrinkage properties of the sheet are stabilized and do not deteriorate as rapidly with age as occurs where CFCs and alkanes are used as blowing agents which volatilize and leave the sheet with age. Shrinkage tests conducted on sheet immediately following extrusion and after a three-month aging period yield data typically indicated as follows:

TABLE 8

| Blowing Agent | Blending Agent | % Shrinkage @ 220° F. | |
|---|---|---|---|
| | | At extrusion | After 3 months |
| Freon 11 | None | 12–14 | 4–6 |
| Atmospheric | 1.0% | 12–14 | 10–12 |

TABLE 8-continued

| Blowing Agent | Blending Agent | % Shrinkage @ 220° F. | |
|---|---|---|---|
| | | At extrusion | After 3 months |
| gas | | | |

Another advantage of the addition of a non-volatile blending agent of the type selected in combination with use of an atmospheric gas is that the blending agent does not evaporate and condense on the die lips, cooling air devices or sizing mandrel parts which may occur with volatile constituents present in the polymer melt. If CFCs and alkanes are used, dimers and oligomers from the polystyrene resin are soluble in CFCs and alkanes and will volatilize with these blowing agents upon exiting from the extrusion die. The dimers and oligomers will then tend to condense on cool metallic surfaces in the die mandrel area and accumulate to a point where liquid drips onto the web. These low molecular weight constituents will form blemishes on the sheet surface and weaken the sheet. In subsequent printing, blanking and/or slitting of such rolls at high speeds, these areas may create random tear outs usually leading to web breaks during processing.

A further advantage of the use of the atmospheric gases in making foam material in accordance with the invention is that the resultant foam sheet is less susceptible to gauge bands than foam made with plasticizing blowing agents such as CFCs and alkanes. This may be contrasted to foam made by utilizing the CFCs and alkanes where such gauge bands representing variations in thickness across the width of a sheet cut from an extruded tube which result in differences in caliper (gauge) called gauge bands. Since atmospheric gases are not soluble and are not present in the foam as would be the case when using CFCs and alkanes, the formed foam sheet is more resistant to stretching and compression thus allowing application of more tension and pressure in roll formation. FIG. 3 illustrates a modification in winder design to apply added pressure between the face of a reel drum surface winder and the forming roll. This modification allows direct continuous pressure on the range of 60–80 PSI as opposed to 20–50 PSI pressure transmitted through leverage linkage by a power cylinder C in the normal winding of foam where the pressure diminishes as the roll increases in diameter. This modification has been found to virtually eliminate gauge bands as long as typical gauge uniformity is maintained in the cross direction of the web. Gauge bands have been problematical in the foam industry for years creating distortions in the web in roll storage to later cause problems in printing, blanking, slitting or product performance. Much effort has therefore been used in the industry to make rotating dies and/or air rings or more sophisticated means to improve cross direction gauge uniformity. The use of atmospheric gases insoluble in the formed polystyrene foam sheet generates a less permanently deformable substrate thereby allowing added pressure to be applied in roll formation leading to a dramatic improvement in roll quality by the virtual elimination of gauge bands.

The following table represents examples of foam materials made by utilizing various atmospheric gases and the attained caliper and density with and without blending agents or varying the amount of blending agent.

TABLE 9

| BLOWING AGENT | % | % BLENDING AGENT | CALIPER MILS | DENSITY PCF | COOLING EXTRUDER AVG °F. | AMPS | RPM | MELT TEMP | NON-FOAM LAYER CALIPER (MILS) | COMMENTS |
|---|---|---|---|---|---|---|---|---|---|---|
| Nitrogen | 0.4 | 1.5 | 6.7 | 20.3 | 242 | 93 | 10.0 | 318 | 0.5 | |
| | 0.4 | 0 | 6.7 | 19.2 | 242 | 93 | 10.4 | 337 | 0.5 | Melt 19° higher |
| | 0.9 | 1.5 | 6.7 | 15.3 | 242 | 73 | 8.6 | 324 | 0.5 | Shear heat with lower amps |
| | 0.9 | 0 | 6.7 | 15.6 | 242 | 88 | 9.8 | 334 | 0.5 | |
| | 0.9 | 0 | 6.7 | 15.3 | 207 | 119 | 10.6 | 320 | 0.5 | Gas dispersion poor chevrons & high amps |
| | 0.5 | 1.9 | 16.0 | 14.0 | 223 | 90 | 11.7 | 321 | 0.5 | |
| 94% N₂ | 0.4 | 1.5 | 6.7 | 20.1 | 244 | 92 | 10.1 | 320 | 0.5 | |
| | 0.4 | 1.5 | 6.7 | 17.7 | 244 | 92 | 10.1 | 310 | 0 | |
| Air | 0.4 | 1.5 | 6.7 | 20.3 | 244 | 93 | 10.2 | 312 | 0.5 | |
| | 0.3 | 1.4 | 6.7 | 17.8 | 244 | 93 | 10.2 | 312 | 0 | |
| | 0.3 | 1.4 | 30.0 | 12.4 | 244 | 93 | 10.2 | 312 | 0 | |
| Helium | 0.3 | 1.4 | 7.0 | 21.6 | 244 | 95 | 10.5 | 318 | 0.5 | |
| CO₂ | 0.8 | 1.5 | 6.7 | 20.6 | 242 | 95 | 10.8 | 322 | 0.5 | |
| | 0.8 | 1.5 | 6.7 | 20.1 | 233 | 98 | 10.4 | 318 | 0 | |
| | 0.8 | 0 | 6.7 | 21.0 | 242 | 105 | 11.2 | 329 | 0.5 | Amperage & melt temp increase |
| | 1.0 | 0 | 6.7 | 18.4 | 242 | 102 | 11.1 | 326 | 0.5 | Added CO₂ lowers amps & melt temp |
| | 1.0 | 0 | 6.7 | 18.4 | 228 | 110 | 11.6 | 322 | 0.5 | At equal melt temp fluid lowers amps |
| | 1.0 | 0.8 | 6.7 | 18.0 | 242 | 95 | 10.9 | 322 | 0.5 | |
| | 1.0 | 1.5 | 6.7 | 18.0 | 242 | 90 | 10.1 | 319 | 0.5 | Added fluid lowers amps & melt |
| | 0.5 | 1.9 | 16.0 | 15.6 | 220 | 92 | 14.8 | 322 | 0.5 | |
| | 0.6 | 1.9 | 18.0 | 13.4 | 216 | 95 | 15.1 | 324 | 0.5 | |
| | 0.5 | 1.8 | 27.0 | 14.0 | 214 | 94 | 14.8 | 320 | 0 | |

Effects of increases in carbon dioxide usage on caliper and density and changes in line speed.

TABLE 10

| Blowing Agent | % | % Blending Agent | Caliper Mils | Density PCF | Line Speed FPM |
|---|---|---|---|---|---|
| 1. CO₂ | 0.7 | 1.9 | 15.2 | 17.5 | 63 |
| 2. | 0.8 | 1.9 | 15.0 | 16.1 | 70 |
| 3. | 1.0 | 1.9 | 14.4 | 15.0 | 80 |
| 4. | 1.1 | 1.9 | 14.5 | 13.5 | 89 |
| 5. | 1.0 | 1.9 | 23.0 | 13.3 | 57 |
| 6. | 1.0 | 1.9 | 32.0 | 12.3 | 44 |
| 7. | 1.1 | 1.9 | 32.0 | 11.2 | 48 |
| 8. | 1.1 | 1.9 | 44.0 | 10.0 | 40 |
| 9. | 1.3 | 1.9 | 60.0 | 11.0 | 33 |

Examples 1–4

Increasing the amount of carbon dioxide while maintaining relatively constant caliper (@15 mil), results in density decreases from 17.5 to 13.5 PCF. Line speed must be increased to maintain constant caliper.

Examples 5–9

Slowing the line speed at a given condition will lead to an increase in caliper and a reduction in density. Data shows an increase in carbon dioxide also leads to a density reduction and a line speed increase at a higher (32 mil) caliper level.

The following table summarizes the results of shrinkage of a foam sheet having a thickness of 7 mils and a density of 20 lbs/cu. ft.; at 200° F., 210° F. and 220° F. in the machine direction and cross machine direction.

TABLE 11

| Test Sample | 200° F. MD | 200° F. CD | 210° F. MD | 210° F. CD | 220° F. MD | 220° F. CD | Cell Area |
|---|---|---|---|---|---|---|---|
| 100% Freon 22 W/Skin | 2.12 | −.46 | 11.91 | −.71 | 41.31 | 4.09 | .0173 |
| 100% Freon 22 No/Skin | 2.98 | .28 | 12.06 | 1.33 | 41.44 | 12.21 | .0182 |
| CO₂ W/Skin | 2.64 | −.02 | 11.89 | −.01 | 43.32 | 5.56 | .0214 |
| CO₂ No/Skin | 3.68 | .10 | 14.43 | .87 | 44.53 | 12.24 | .0270 |
| N₂ W/Skin | 3.62 | −.39 | 17.73 | 1.00 | 47.23 | 6.04 | .0277 |
| N₂ No/Skin | 6.34 | −.36 | 20.90 | 1.74 | 51.00 | 11.09 | .0346 |
| 94% N₂ W/Skin | 2.85 | −.31 | 14.76 | .60 | 46.54 | 5.05 | .0431 |
| 94% N₂ No/Skin | 3.39 | −.07 | 17.32 | 1.57 | 47.84 | 15.39 | .0359 |
| Comp. Air W/Skin | 2.96 | −.14 | 13.89 | .83 | 43.78 | 5.64 | .0336 |
| Comp. Air No/Skin | 3.66 | .14 | 16.10 | 2.17 | 44.79 | 14.35 | .0314 |
| He W/Skin | 3.03 | .38 | 17.85 | 2.94 | 47.14 | 10.01 | .0384 |

TABLE 12

Sheffield Smoothness - Foam/Mandrel Side

| Blowing Agent | Unfoamed Layer | Smoothness | Rating |
|---|---|---|---|
| N₂ | + | 2.17 | 1-Best |
| N₂ | − | 2.42 | 2 |
| CO₂ | + | 3.34 | 3 |
| Air | − | 3.92 | 4 |
| Freon 22 | + | 3.92 | 4 |
| Air | + | 4.25 | 5 |
| N₂ (94%) | + | 4.34 | 6 |
| Freon 22 | − | 4.50 | 7 |
| N₂ (94%) | − | 4.84 | 8 |
| CO₂ | − | 5.42 | 9 |
| He₂ | + | 63.80 | 10-Worst |

+ Yes
− No

It can be seen that the use of atmospheric gases produces varying degrees of smoothness.

Although the invention has been described as preferably applicable to polystyrene foam sheet material, the method is also applicable to utilizing atmospheric gases without a non-volatile blending agent to make foam polypropylene and polyethylene foam sheet material.

It can thus be seen that there has been provided a method of making polystyrene foam wherein the method utilized atmospheric gases as blowing agents which are inherent in the atmosphere; wherein the blowing agent is substantially entirely released when the polystyrene foam is extruded; wherein the melt can be cooled to normal process levels and not create high loading on the extruder or shear heat from high polymer viscosity; wherein the amount of shrinkage can be controlled as may be required for the ultimate use of the foam; and wherein the density and cell size can be controlled; and which utilizes conventional extrusion apparatus.

We claim:

1. The method of making heat shrinkable foam sheet material adapted to be used to form shrinkable labels on containers or cups which comprises
   introducing atmospheric gas as the blowing agent into a molten thermoplastic resin in an amount of less than 2% by weight,
   coextruding a plastic film layer and a foam layer such that the foam layer and plastic film layer form a frustoconical tubular web comprising a foam layer and a plastic film at an angle to the axis of the extruder,
   passing said frustoconical web over an internal cooling mandrel to cool the interior of the web,
   simultaneously applying cooling air to the outside of the frustoconical web,
   said step of applying cooling air to the outside of the frustoconical web comprising applying cooling air axially to the outside of said frustoconical web at an acute angle tangentially to the web whereby the cooling air moves in a direction parallel to the frustoconical web from adjacent the extruder to adjacent the internal cooling mandrel such that the external surface of the frustoconical web is cooled by cooling air and by the ambient air drawn by the cooling air against the external surface of the frustoconical web,
   such that the resultant coextruded sheet material comprises a foam layer and a plastic film has substantially no residual blowing agent, and is substantially dimensionally stable at ambient temperatures and has greater shrinkage in a machine direction than in a cross direction at elevated temperatures, and shrinkage properties which do not change substantially when the foam material is stored.

2. The method set forth in claim 1 including introducing a non-volatile blending agent into the molten thermoplastic resin containing the atmospheric gas, said blending agent being substantially non-volatile at the extrusion temperature.

3. The method set forth in claim 2 wherein said non-volatile blending agent comprises a high molecular weight material.

4. The method set forth in claim 3 wherein said non-volatile blending agent is of an ester.

5. The method set forth in claim 4 wherein said ester is selected from the group consisting of diisodecyl adipate, ditridecyl adipate and trioctyl trimellitate.

6. The method set forth in claim 5 wherein said non-volatile blending agent has a molecular weight of at least 350.

7. The method set forth in claim 3 wherein said non-volatile blending agent comprises 3% or less by weight.

8. The method set forth in any one of claims 1 or 2-7 wherein said molten thermoplastic resin comprises polystyrene.

9. The method set forth in any one of claims 1 or 2-7 wherein said thermoplastic resin comprises a resin selected from the group consisting of polypropylene or polyethylene.

10. An apparatus for forming an extruded thermoplastic foam product comprising
    means for heating and extruding a resin in the form of a tubular web,
    means for introducing said resin to said means for heating and extruding,
    means for introducing an atmospheric gas as a blowing agent to said means for heating and extruding,
    means for coextruding a plastic film layer with said foam layer to form a frustoconical web at an acute angle to the axis of the extruder,
    means for passing said frustoconical web over an internal cooling mandrel to cool the interior of the web, and
    said means for applying cooling air to the outside of the frustoconical web comprising means for applying cooling air axially to the outside of said frustoconical web at an acute angle tangentially to the web whereby the cooling air moves in a direction parallel to the frustoconical web from adjacent the extruder to adjacent the internal cooling mandrel such that the external surface of the frustoconical web is cooled by cooling air and by the ambient air drawn by the cooling air against the external surface of the frustoconical web,
    means for simultaneously applying cooling air axially to the outside of said web whereby the cooling air moves in a direction along the frustoconical web from adjacent the extruder to adjacent the internal cooling mandrel such that the external surface of the frustoconical web is cooled by the cooling air against the external surface of the frustoconical web and such that the resultant foam has substantially no residual blowing agent and is substantially dimensionally stable at ambient temperatures and has substantially no corrugations.

11. The apparatus set forth in claim 10 including a cooling ring positioned adjacent the internal cooling mandrel and means for passing said tubular web into contact over said cooling ring before it passes to the mandrel.

12. The apparatus set forth in claim 11 including means for creating a differential pressure at said cooling ring causing the extruded material to maintain contact with said ring.

13. The apparatus set forth in claim 12 wherein said means for creating a differential pressure comprises means providing a passage from the surface of the mandrel to the atmosphere such that the movement of the extruded material over the passage creates a vacuum.

14. The apparatus set forth in claim 10 including means for passing a web of the material between a winding roller and driver roller, thereafter over a winding roller to be wound on said winding roller including means providing a compressive force on said winding roller toward said driver roller such as to subject the width of said web with sufficient force to minimize gauge bands.

15. The apparatus set forth in claim 10 including means for introducing into the molten thermoplastic resin a blending agent which is substantially non-volatile at the extrusion temperature.

* * * * *

UNITED STATES PATENT AND TRADEMARK OFFICE
CERTIFICATE OF CORRECTION

PATENT NO. : 5,443,769  
DATED : August 22, 1995  
INVENTOR(S) : James A. Karabedian, et al It is certified that error appears in the above-indentified patent and that said Letters Patent is hereby corrected as shown below:

In the Drawings, delete Fig. 1 and replace with Fig. 1 attached hereto.

Signed and Sealed this

Twelfth Day of March, 1996

Attest:

BRUCE LEHMAN

*Attesting Officer*   *Commissioner of Patents and Trademarks*